United States Patent
Jain et al.

(10) Patent No.: US 9,294,349 B2
(45) Date of Patent: Mar. 22, 2016

(54) HOST TRAFFIC DRIVEN NETWORK ORCHESTRATION WITHIN DATA CENTER FABRIC

(71) Applicant: Cisco Technology, Inc., San Jose, CA (US)

(72) Inventors: Vipin Jain, San Jose, CA (US); Dhananjaya Rao, Milpitas, CA (US); Palathingal Frank, Pleasanton, CA (US); Shyam Kapadia, Santa Clara, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 14/053,988

(22) Filed: Oct. 15, 2013

(65) Prior Publication Data

US 2015/0103692 A1    Apr. 16, 2015

(51) Int. Cl.
*H04L 12/24* (2006.01)

(52) U.S. Cl.
CPC ......... *H04L 41/0806* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 2010/0054117 A1* | 3/2010 | Southworth et al. | 370/216 |
| 2011/0238816 A1 | 9/2011 | Vohra et al. | |
| 2012/0166786 A1 | 6/2012 | Selitser | |
| 2013/0058229 A1* | 3/2013 | Casado et al. | 370/252 |
| 2013/0108263 A1* | 5/2013 | Srinivas et al. | 398/45 |

OTHER PUBLICATIONS

CISCO, "Autoprovisioning Data Center Top-of-Rack Switches," White Paper, Jun. 2010, pp. 1-60.

* cited by examiner

*Primary Examiner* — Diane Lo
(74) *Attorney, Agent, or Firm* — Edell, Shapiro & Finnan, LLC

(57) ABSTRACT

Presented herein are techniques to handle data packets received at a top-of-rack (ToR) switch in an underlay network hosting one or more tenant networks. The underlay network may comprise a plurality of ToR switches each connected to each of a plurality of spine switches. The data packet may be received from a virtual machine in a tenant network, and have a header with a data packet identifier. A mobility domain identifier may be determined that corresponds to the network portion within which the virtual machine can be migrated. The mobility domain may be configured on the ToR switch on a per-port basis based on the virtual machine connected to the ToR switch port. A unique identifier may be formed based on the data packet identifier and mobility domain identifier. Using this unique identifier, provisioning information may be obtained for the tenant network on the ToR switch.

20 Claims, 7 Drawing Sheets

HOST TRAFFIC DRIVEN NETWORK ORCHESTRATION WITHIN DATA CENTER FABRIC

TECHNICAL FIELD

The present disclosure relates to provisioning switches in a network environment.

BACKGROUND

In data center environments, rack units may house many server devices. Each server device may be configured to host one or more physical or virtual host (virtual machine) devices. The servers in the rack units are connected to top-of-rack (ToR) switch devices. The ToR switches, in turn, are connected to other ToR switches via a spine switch or spine fabric. The ToR switches and spine switches form a physical underlay network, which may be used by multiple tenant networks that exchange data communications between host devices (physical and/or virtual) in different rack units. For example, packets of data communications may be sent from a virtual machine in one rack unit to a virtual machine in another rack unit. These packets may be routed between corresponding ToR switch devices and the intermediary spine switch. The ToR switches are configured to store address information associated with the host devices in the data center environment. An important aspect of network orchestration is to instantiate network elements for a tenant network on-demand and to reclaim them after their use is completed.

DESCRIPTION OF EXAMPLE EMBODIMENTS

Overview

Presented herein are techniques to handle data packets received at a top-of-rack (ToR) switch in an underlay network hosting one or more tenant networks. The underlay network may comprise a plurality of ToR switches each connected to each of a plurality of spine switches. The data packet may be received from a virtual machine in a tenant network, and have a header with a data packet identifier. A mobility domain identifier may be determined that corresponds to the network portion within which the virtual machine can be migrated. The mobility domain may be configured on the ToR switch on a per-port basis based on the virtual machine connected to the ToR switch port. A unique identifier may be formed based on the data packet identifier and mobility domain identifier. Using this unique identifier, provisioning information may be obtained for the tenant network on the ToR switch.

Example Embodiments

Figure 1:
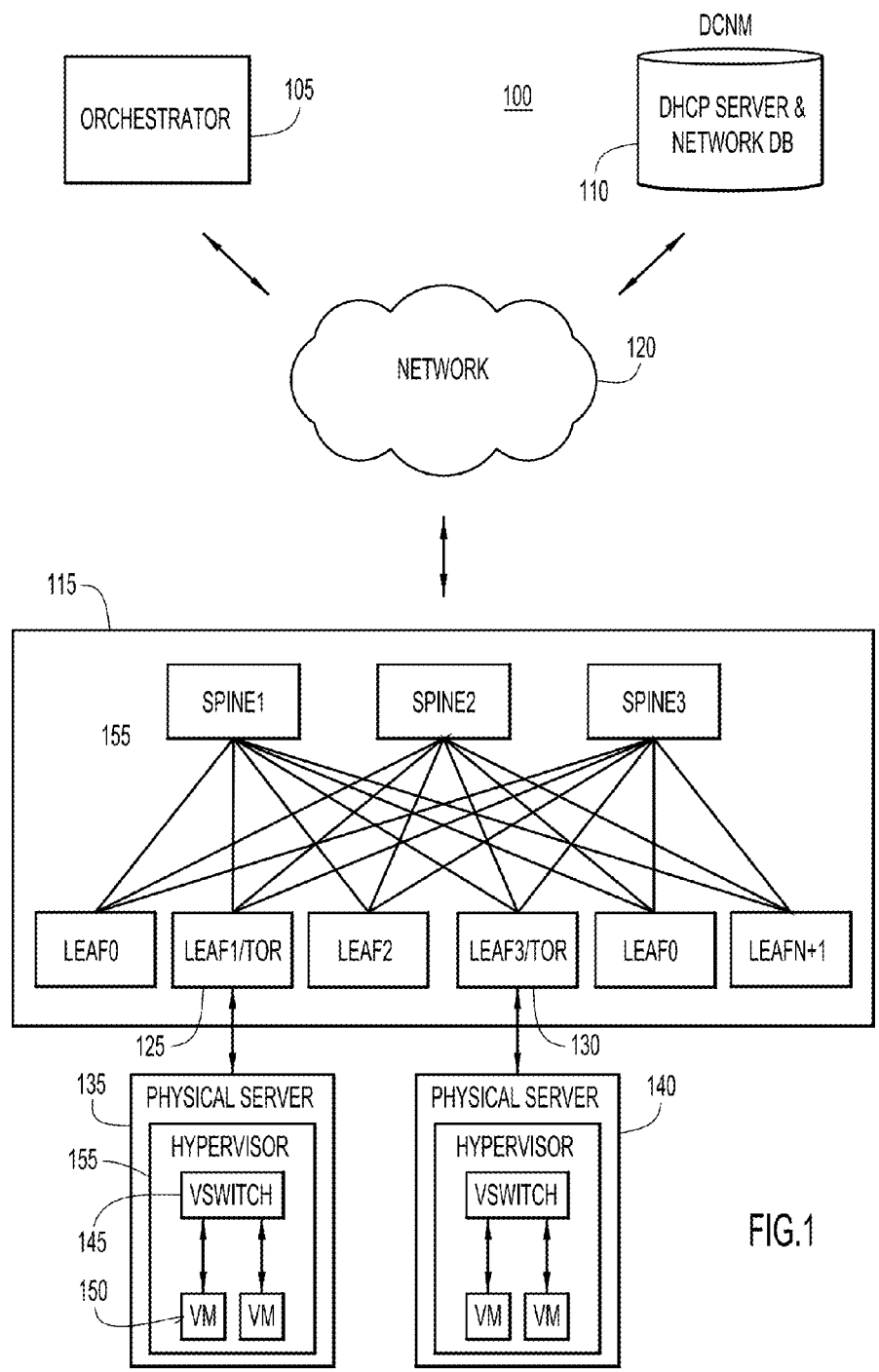
FIG. 1 shows an example system or network topology including one or more virtual machines communicating with one or more virtual switches hosted by one or more physical servers, each of which is configured to send packets through corresponding leaf or Top-of-rack (ToR) switches connected to a spine fabric.

Reference is first made to FIG. 1. FIG. 1 shows a system 100 in which an orchestrator 105 may coordinate with a Data Center Network Manager (DCNM) 110 to create, modify, provision and/or delete one or more tenant networks residing in a leaf/spine underlay fabric 115 via network 120. Each leaf in the topology may be a ToR switch (e.g. top-of-rack (ToR) switches 125 or 130) located in a rack unit that houses one or more network elements such as physical servers. Each ToR switch is configured to route communications between physical servers in the rack unit and other network elements. Each physical server (e.g. server 135 associated with ToR switch 125, or server 140 associated with ToR switch 130) may host one or more virtual switches 145 and virtual hosts (virtual machines) 150. Virtual switches and virtual machines may created and run on each physical server on top of a hypervisor 155.

Each virtual switch 145 may be configured to manage communications of virtual machines in particular virtual networks and/or subnetworks (subnets). Each virtual switch 145 may be embodied by software stored and executed on the physical server 135. Thus, the virtual switch 145 performs functions of a physical switch device. Similarly, each virtual machine 150 may be software stored and executed on the physical server 135. The virtual machine 150 is configured to exchange communications with other virtual machines via the fabric 115. It is appreciated that any number of physical servers hosting any number of virtual switches and virtual machines may be present in the system 100. For simplicity, FIG. 1 shows one physical server 135 associated with ToR switch 125 and one physical server 135 on ToR switch 130. Virtual switch 145 may, in one example, manage communications of multiple virtual machines of the physical server 135.

Though not shown in FIG. 1, the physical server 135 associated with ToR switch 125 may be housed in a rack unit or "rack." Other physical servers may also be housed in the rack. ToR switches 125 and 130 are responsible for managing communications (e.g., routing and forwarding) originating from and destined for physical servers (and virtual machines and virtual switches hosted by the physical servers) in the rack. Hence the term "top-of-rack" (ToR) ascribed to switches 125 and 130, and any other leaf switch in FIG. 1. ToR switches 125 and 130 may be used to provide redundancy and fault-tolerance for communications associated with physical servers, virtual machines and virtual switches in the rack. Thus, ToR switch 125 is a peer to ToR 130, and vice versa. These ToR switches may be configured to communicate with a network controller unit ("network controller"), not shown in FIG. 1, which is configured to manage communications between ToR switches in different racks.

As stated above, physical server 135 hosts the virtual switch 145 and virtual machine 150. The virtual machine 150 may exchange communications (e.g. data packets) with other virtual machines in the network via ToR switch 125. Each virtual machine is a member of a tenant network. A tenant network is a unique layer 3 subnet which may contain one or more VLANs. For example, a tenant Company A has 2 tiers/ tenant networks namely 1.1.1.0/24 and 2.2.2.0/24. A subnet, i.e., a tenant network, can span multiple VLANs. As the tenant network of which virtual machine 150 is a member "joins" the network, it may be provisioned with certain network attributes in order to exchange communications. For example, upon instantiation, a tenant network and a virtual machine therein may be provisioned with virtual network segmentation resources, for example the virtual machine and tenant network may be associated with one or more virtual Local Area Network (VLAN) identifiers, and a subnet identifier. In one example, virtual network segmentation resources may be provisioned on a per-switch or per-port basis (e.g., up to four thousand VLANs per switch or four thousand per port of a switch). Thus, when a tenant network and virtual machine therein are created, a ToR switch may select an unused VLAN for a given segmentation assignment. The virtual segmentation resources may also include a Switch Virtual Interface (SVI) assignment, an Access Control List (ACL) assignment, a Quality of Service (QoS) assignment, a Virtual Routing and Forwarding (VRF) assignment, etc. It should be appreciated that other network information now known or heretofore contemplated may also be assigned to the virtual machine. Each tenant network is also associated with a segment identifier (segment ID), which is used to uniquely identify the tenant network in the leaf/spine fabric 115. A segment ID is a 24-bit identifier that allows 16 million unique tenant networks to be addressed. VXLAN is a specific MAC over IP/UDP encapsulation scheme that also has a VNI (virtual network identifier) which also happens to be 24-bits. However, the term "segment" as used herein is more generic than a VNI in that it is an identifier, but it does not dictate that the encapsulation should be VXLAN or any other encapsulation scheme.

Additionally, upon instantiation, the virtual machine 150 may be provisioned with identifier information that may include an Internet Protocol (IP) address, a Media Access Control (MAC) address, a port number associated with the VLAN to which it is assigned, etc. Tenant network and tenant network element instantiation, modification and deletion may be performed by the orchestrator 105, while segmentation resources may be stored on a network database on the DCNM 110. The VMware™ suite is an example orchestrator solution. Orchestrator 105 software may include vCloud Director™, vCenter Server™, and vShield Manager™, though other software solutions may be able to perform the functions of the orchestrator 105 according to techniques presented herein. The orchestrator 105 may additionally coordinate with a Dynamic Host Configuration Protocol (DHCP) server on or outside the DCNM 110 to provide IP address information to allow virtual machines to communicate over an IP network. Once the virtual machine 150 is instantiated with resources, which may also include assigning one or more network identifiers such as a subnet or VLAN to the virtual machine's virtual network interface card (vNIC), the virtual machine 150 becomes capable of exchanging communications with other virtual machines (that have also been properly instantiated) in the network.

In order to provision a tenant network and a virtual machine therein at the associated ToR switch on the underlay network, configuration messages using a control protocol may be exchanged between a virtual switch 145 that manages the virtual machine 150 and the associated ToR switch 125 to which the physical device hosting the virtual switch and virtual machine are connected. An example control protocol for sending configuration messages is a Virtual Station Interface (VSI) Discovery Protocol (VDP) "digital handshake" message as defined by the Institute of Electrical and Electronic Engineers (IEEE) 802.1Qbg standard. VDP is a reliable protocol that enables configuration messages to be exchanged between a VSI and a ToR switch in order to provision a virtual machine managed by the virtual switch with network resources (including virtual network segmentation resources). Specifically, VDP enables provisioning of network resources on physical switch ports associated with the virtual switch, one of which may be associated with the virtual machine. For example, the virtual switch may have multiple physical switch ports associated with it, and the virtual machine may be configured to exchange communications via one of these ports. As VDP messages are exchanged between the virtual switch and the ToR switch, the port that is associated with the virtual machine may be provisioned with the network resources. For simplicity, FIG. 1 shows a virtual machine connected to a single virtual switch, and thus, the VDP message exchanges herein are described in association with this example. However, it should be appreciated that the techniques described herein may enable network resources to be provisioned for multiple virtual machines, multiple virtual switches and multiple physical servers. It should also be appreciated that VDP is merely used as an example herein and that the techniques described herein are generally applicable to any handshake-based provisioning protocol between a virtual switch and a ToR switch.

Figure 2:
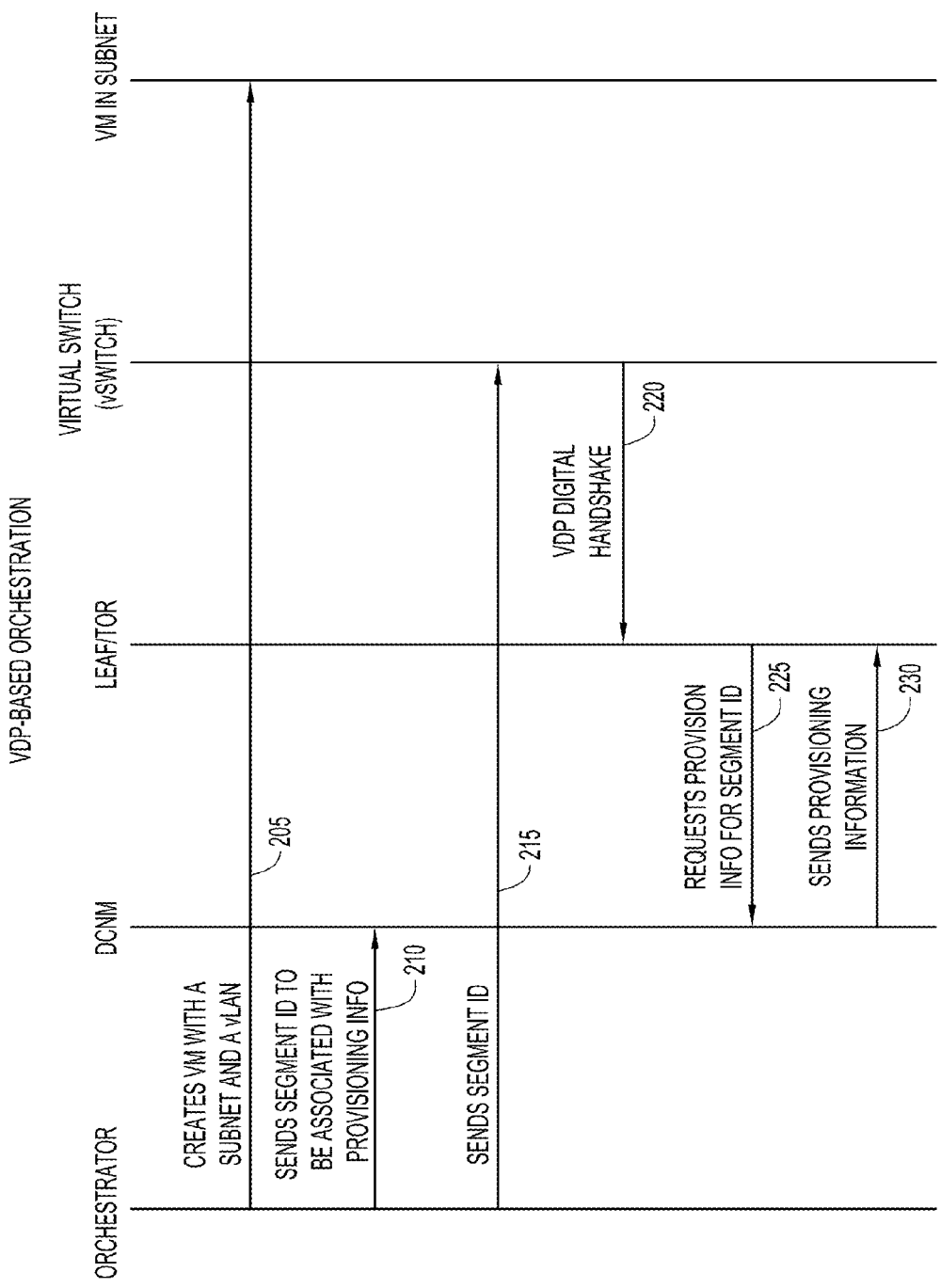
FIG. 2 is an example ladder diagram depicting virtual station interface (VSI) discovery protocol (VDP), which provisions an associated ToR switch when a tenant network is created or modified.

An example VDP pull-based provisioning of a ToR switch in response to a tenant network creation event is shown in FIG. 2. A user at an orchestrator may instantiate a virtual machine and associated tenant network at step 205. The virtual machine may have an associated subnet and VLAN. The virtual machine may be created on a physical or virtual server associated with a ToR switch. The tenant network is assigned a segment ID by the orchestrator which may be provided to the DCNM and associated with provisioning information for a ToR switch at step 210 using, for example, a representational state transfer (REST) application programming interface (API). Alternatively, the DCNM may assign the segment ID itself from a pool of free segment IDs. At step 215, the segment ID is sent from the orchestrator to the virtual switch (vSwitch). The vSwitch may be, for example a Cisco Systems, Inc. Nexus 1000V virtual switch. Alternatively, the segment ID may be provided to the virtual machine, which provides it to the vSwitch. The DCNM may also provide the segment ID to the vSwitch or virtual machine. A handshake mechanism may be performed at step 220 if the vSwitch and/or associated hypervisor executing the vSwitch are capable of communicating using VDP. The VDP digital handshake provides the segment ID to the ToR switch. This may trigger a database manager on the ToR switch to query or "pull" configuration information from the DCNM network database using the segment ID as a unique identifier or key, as shown at step 225. The DCNM may respond by sending provisioning information at step 230, thus instantiating the tenant network and virtual machine on the ToR switch. Virtual machines created thereafter within the tenant network would not necessarily trigger re-provisioning of corresponding resources associated with the tenant segment, as the tenant network has already been provisioned on the ToR switch. Thus, resources may be dynamically and automatically allocated across an underlay network and tenant network in response to tenant network and/or virtual machine creation.

However, the virtual switch and/or hypervisor may not be VDP-compatible, and thus may not be able to provide a segment ID to the ToR switch. Thus, the ToR switch cannot pull the required configuration information from the DCNM database. In this scenario, the ToR switch may require, directly or indirectly, an identifier or set of identifiers that map uniquely to a tenant network that can be employed to pull the required configuration from the DCNM.

Figure 3:
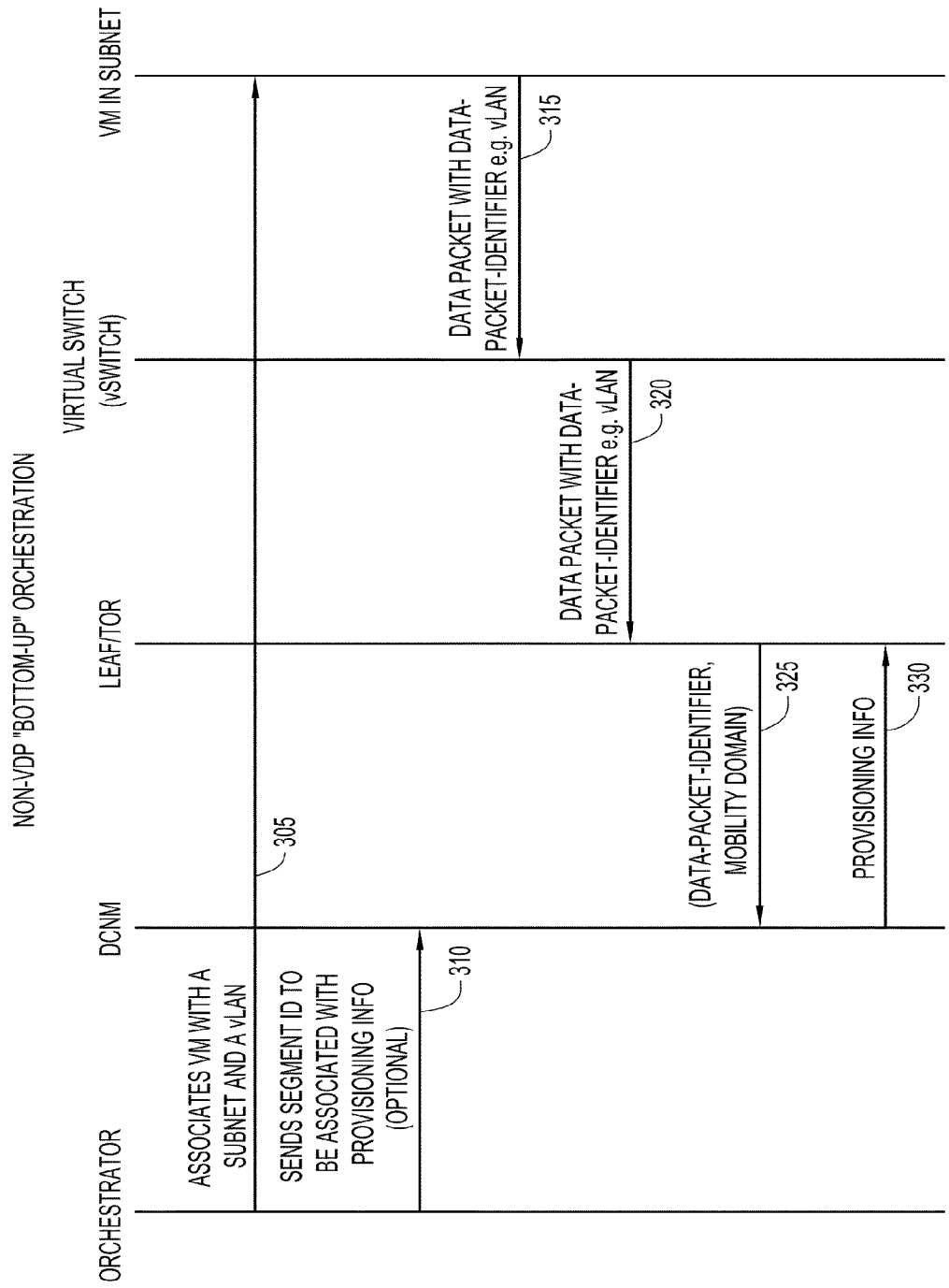
FIG. 3 is an example ladder diagram depicting data-packet-driven non-VDP provisioning of an associated ToR switch when a tenant network is created or modified according to techniques presented herein.

One technique to provision a ToR switch for a tenant network without VDP is shown in FIG. 3. At step 305, the orchestrator may instantiate a tenant network and a virtual machine thereon. A user may create the tenant network and virtual machine using orchestrator software. The virtual machine may be associated with a subnet and a VLAN. The orchestration software may also send the segment ID and other configuration information for the tenant network to the DCNM at step 310 using, for example, a REST API. Alternatively, if the orchestrator solution does not use segment IDs, the segment ID may be allocated from a pool of free segment IDs at the DCNM. The segment ID may still be used as a unique identifier for the tenant network within the spine/leaf switch fabric 115.

Packets sent from the virtual machine to the vSwitch and/or hypervisor at step 315 contain a header that may contain a data packet identifier or network identifier such as a VLAN tag. Packets sent from the virtual machine may include Dynamic Host Configuration Protocol (DHCP) packets, Address Resolution Protocol (ARP) packets, Neighbor Discovery Protocol (NDP) packets, etc. Data packet identifiers used according to techniques presented herein are not limited to VLAN network identifier tags, but may also include a Virtual Extensible LAN (VXLAN) network identifier (VNI), Multiprotocol Label Switching (MPLS) label, etc. At step 320, the data packet may be forwarded by the vSwitch/hypervisor to the ToR switch. The virtual machine and vSwitch/hypervisor may not "know" that the ToR switch has not been provisioned for the tenant network at this point. Rather, packets from the virtual machine and vSwitch/hypervisor forwarded to the ToR switch may be normal network traffic.

The ToR may perform a layer 2 learn event by reading the media access control (MAC) address in the packet header to discover that the virtual machine and the associated tenant network has not yet been provisioned. The ToR may use the received data packet identifier such as the VLAN tag, along with the mobility domain (based on the ingress/incoming port), to create an identifier that maps to exactly one segment ID. A VLAN identifier alone may be insufficient to map to exactly one segment ID. For example, a given virtual data center (e.g. Vmware vCenter) may have up to 4,096 VLANs, but there may be multiple linked vCenters with duplicate VLAN identifiers. This may happen when a tenant network with a given subnet runs out of VLANs, and thus a linked vCenter with a new pool of 4,096 VLANs is created. For example, this will be the case when the same network segment needs to be extended across multiple vCenters since the first vCenter ran out of resources. Thus, to create a unique identifier that corresponds to only one segment ID, another variable is needed besides a VLAN. The mobility domain may provide this unique correspondence.

The mobility domain is an identifier defining the domain within which a virtual machine may be moved (migrated) from one physical server to another physical server. Thus, the mobility domain is an identifier for a set of VLANs. The mobility domain's movement constraints may be imposed by logical clusters/groups of VLANs created at the orchestrator (i.e. a virtual machine may not be able to be moved outside of a logical grouping of VLANs defined at the orchestrator). For example, although there may be two linked vCenters, and thus duplicate VLAN numbers which may have access to a given segment ID, a given virtual machine may only be moved within one vCenter. Thus, a vCenter identifier, such as a vCenter IP address, may be used as the mobility domain which, along with a VLAN identifier, map uniquely to a given segment ID. The ToR switch may provide the data packet identifier such as the VLAN identifier and mobility domain to the DCNM at step 325. The DCNM may contain logic to map the data packet identifier and mobility domain to a given segment ID, and thus obtain provisioning information that it sends back to the ToR switch at step 330. While the above explanation considers a VM manager like VMware vCenter, the same logic and mechanism applies to other VM managers such as Microsoft Hyper-V's SCVMM (System Center Virtual Machine Manager), Openstack Controller etc.

Other logical clusters may exist on the network that may restrict the movement of a virtual machine, and thus change the mobility domain. For example, another logical cluster may be a distributed virtual switch (DVS). DVS is a technology that allows a user to configure all physical or virtual hosts that are part of the DVS, rather than configure each vSwitch on a per-host basis. In this case, the mobility domain would be all hosts that are a part of the DVS, so the mobility domain identifier may be a DVS identifier. The mobility domain may be set to the DVS name, such as a universally unique identifier (UUID) for the associated vSphere Distributed Switch (vDS) in the case of VMware deployments. The mobility domain identifier may be set to a concatenation of the DVS name and IP address of the associated vCenter.

Another logical cluster may be a Distributed Resource Scheduling (DRS) cluster. DRS load balances computing workloads for physical and virtual hosts within the cluster. The DRS name may be used as the mobility domain, since virtual machines in a DRS cluster may not be freely moved to other DRS clusters. The DRS name may be concatenated with the IP address of the associated vCenter to form the mobility domain identifier.

A mobility domain may be assigned for a given ToR switch port. When a physical host or a virtual machine first sends a packet to a ToR switch, the learn event is triggered on the ToR switch, wherein the physical host or virtual machine may be associated with a port identifier. Other mobility domain identifiers may include, in Microsoft™ solutions, the IP address of the Hyper-V distributed switch controller, and in OpenStack™ solutions, the IP address of the OpenStack controller.

To summarize, the mobility domain is an identifier for a set of VLANs, and may be a vCenter, DVS-id, cluster-id or anything else within which the set of VLANs are scoped. A port identifier typically has a 1:1 or 1:N relationship with the number of VLANs depending on whether the port is configured as an access or a trunk port, respectively. The mobility domain is a logical abstraction or scope under which virtual port groups, port identifiers or port profiles have significance. Every VM virtual NIC (vNIC) is associated with a network segment (or possibly VLAN) by means of a port group or port profile.

Once the pull is performed from the DCNM database to obtain provisioning information for the tenant network at the ToR switch, the tenant network may not need to be re-provisioned, even if there is a creation of another virtual machine in the tenant network.

Logic to provision a ToR switch without VDP may exist on the ToR switch and DCNM, but might not be used if there is a VDP-friendly vSwitch and/or VDP-friendly orchestrator. VDP provides a method to provision the ToR switch for a tenant network before the virtual machine on the tenant network sends the first packet. Thus, activating non-VDP provisioning in this scenario may not be necessary.

Figure 4:
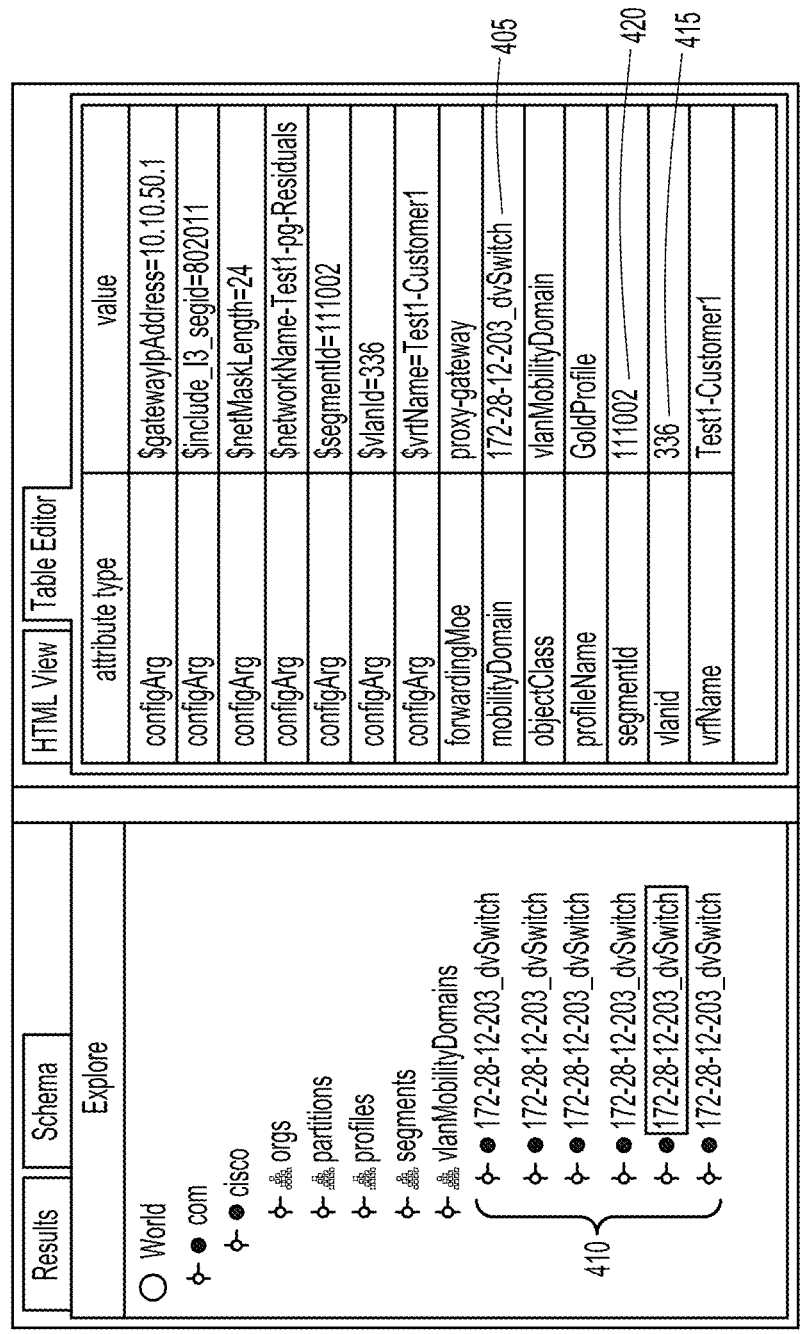
FIG. 4 depicts an example network database entry associated with data-packet-driven non-VDP provisioning of a ToR switch according to techniques presented herein.

An example DCNM network database entry is shown in FIG. 4. The mobility domain identifier may be the IP address of the vCenter, for e.g. 172.28.12.203. If there is an associated DVS, the name of the DVS may be concatenated, e.g.

172.28.12.203_dvSwitch as shown at 405. This string may have multiple associated VLAN identifiers, as shown at 410. Each VLAN identifier for a given mobility domain uniquely corresponds to one segment ID, as shown at 415 and 420. Thus, when a request is received from a ToR switch indicating a mobility domain and VLAN, the DCNM network database may look up the associated table entry, which uniquely maps to a segment ID, and return the associated tenant network provisioning information. The DCNM may generate and store mobility domain identifiers and log associated VLANs and segment IDs as tenant networks are created, modified and deleted in coordination with the orchestrator.

Figure 5:
FIG. 5 depicts an example ToR switch configuration entry.

An example ToR switch configuration which stores a given mobility domain is shown in FIG. 5. While it may be feasible to configure the mobility-domain on a per ToR switch port basis based on the virtualized host that is attached to it, a more sophisticated approach may involve dynamic recognition of the mobility-domain associated with a port. For example, a module sitting on the ToR switch may communicate with the associated VM manager or orchestrator to derive this information. Alternately, this information may be provided to the ToR switch via DCNM that can obtain the same via the orchestrator. As tenant networks are created, modified and deleted, the ToR switch may receive, generate, modify, or delete mobility domain identifiers. When a packet is received from a new virtual machine on a tenant network for which the ToR is not provisioned, the ToR switch may extract the data packet identifier or network identifier, such as the VLAN identifier, determine the associated mobility domain stored at 505, and provide the data packet identifier and mobility domain combination to the DCNM network database.

This solution provides a way to automate the provisioning of resources on ToR switches (that connect to physical and virtual servers, hypervisors and vSwitches) in a virtualized data center based on data packet bottom-up triggers. This is done using the mobility domain, which reflects the orchestrator's view of virtual machine mobility. This solution does not necessarily require any specialized control exchanges between the virtual and physical infrastructure. Rather, standard network traffic packets may trigger this process. These techniques are also advantageous because they are agnostic of the underlying hypervisor or vSwitch solutions, and do not require any modifications in hypervisor or vSwitch behavior. These techniques also are agnostic to various orchestrator solutions.

Figure 6:
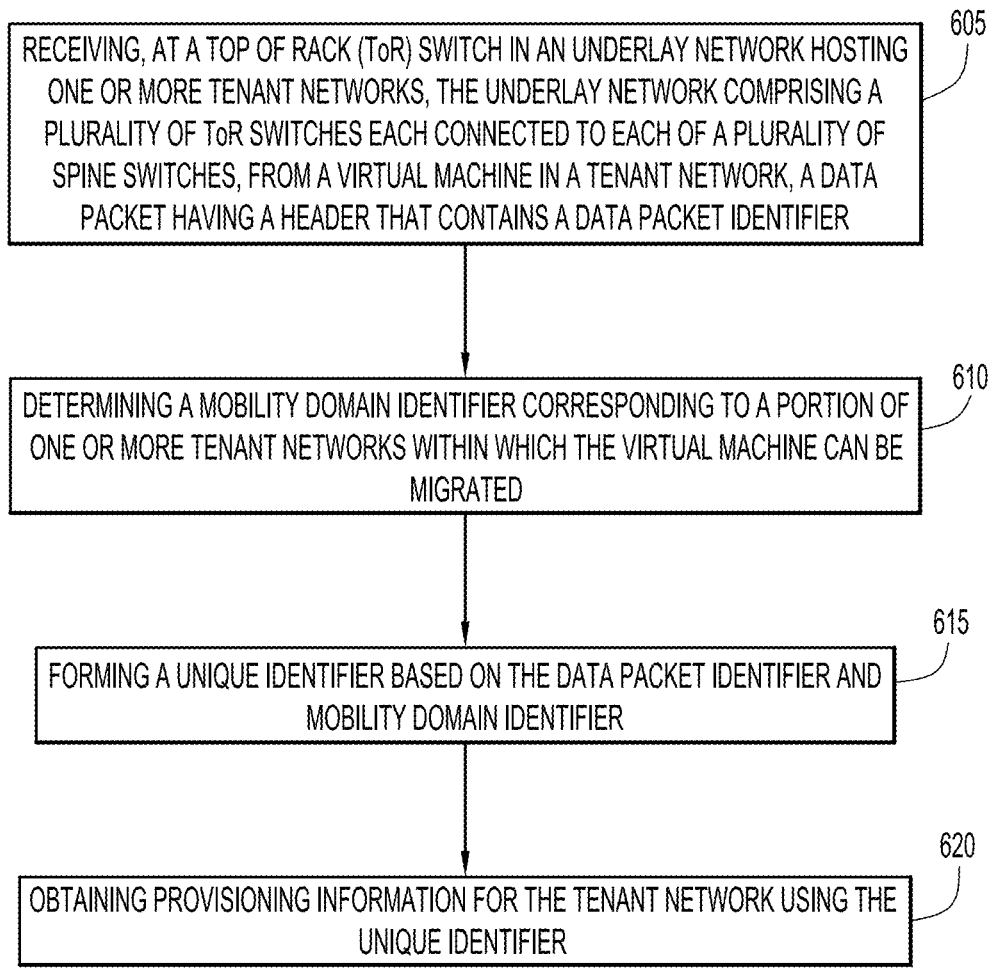
FIG. 6 shows an example flow chart depicting operations to provision a ToR switch when a tenant network is created or modified according to techniques presented herein.

FIG. 6 shows an example flow chart depicting operations to provision a ToR switch when a tenant network is created or modified. A data packet having a header containing a data packet identifier may be received at step 605 from a virtual machine in a tenant network. The data packet may be received at a ToR switch in an underlay network hosting one or more tenant networks, the underlay network comprising a plurality of ToR switches each connected to each of a plurality of spine switches. The mobility domain identifier may be determined at step 610 which corresponds to a portion of one or more tenant networks within which the virtual machine can be migrated. A unique identifier may be formed based on the data packet identifier and the mobility domain identifier at 615. Provisioning information may be obtained for the tenant network using the unique identifier at 620.

Figure 7:
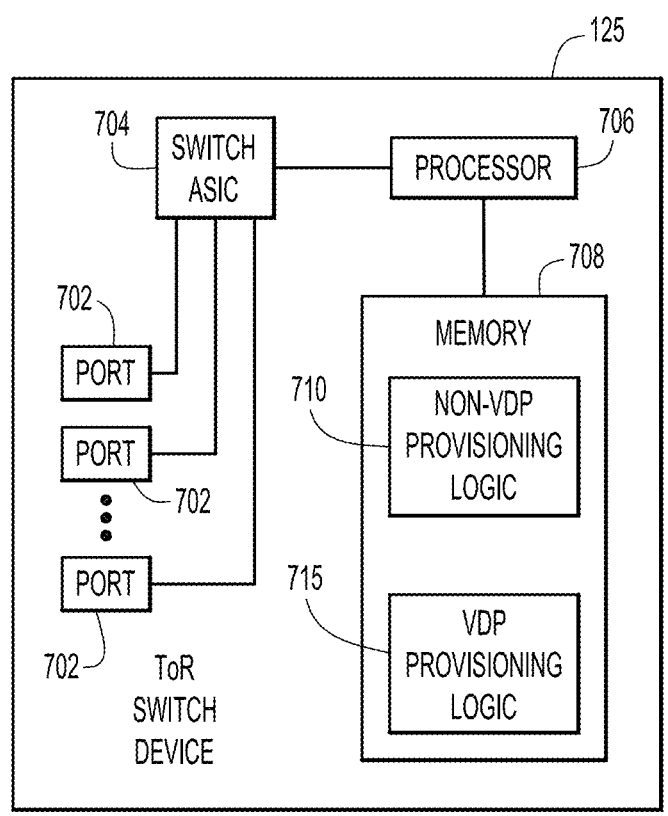
FIG. 7 shows an example block diagram of the ToR switch configured to provide network access to tenant networks according to techniques presented herein.

FIG. 7 shows an example block diagram of the physical ToR switch that is provisioned to provide network access to tenant networks according to techniques presented herein. For simplicity, the ToR switch device in FIG. 7 is shown as reference numeral 125, though it should be appreciated that the ToR switch device 125 may be any of the ToR switch/leaf devices in the network fabric 115. The ToR switch device 125 comprises, among other components, a plurality of network ports 702, a switch application specific integrated circuit (ASIC) unit 704, a processor 706 and a memory 708. The ports 702 are configured to receive communications (e.g., packets) from devices in the system 100 (see FIG. 1) and to send communications to devices in the system 100. For example, the ports 702 may be configured to send/receive data packets to/from the servers 135 and to/from the spine switch 155. The ports are coupled to the switch ASIC 704. The switch ASIC 704 enables packets received by the ToR switch device 125 to be forwarded to the appropriate device in the system 100. For example, when the ToR switch device 125 receives a packet at a first port, the switch ASIC 704 determines a second port on which the packet should be forwarded in the network. That is, if a packet is received at the first port from server 1, the switch ASIC 704 may determine to forward the packet to the second port, which may service a spine switch 155.

The switch ASIC 704 is coupled to the processor 706. The processor 706 is, for example, a microprocessor or microcontroller that is configured to execute program logic instructions (i.e., software) for carrying out various operations and tasks of the ToR switch device 125, as described herein. The memory unit 708 is configured to store information associated with subnet routes, host routes and default routes of received packets. The functions of the processor 706 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 708 may comprise read only memory (ROM), random access memory (RAM), magnetic disk storage media devices, optical storage media devices, flash memory devices, electrical, optical, or other physical/tangible (non-transitory) memory storage devices. The memory 708 stores software instructions for non-VDP provisioning logic/software 710 and for VDP provisioning logic/software 715, both of which contain instructions for executing techniques presented herein. Thus, in general, memory 708 may comprise one or more computer readable storage media (e.g., a memory storage device) encoded with software comprising computer executable instructions and when the software is executed (e.g., by the processor 706), it is operable to perform the techniques described herein for non-VDP provisioning logic/software 710 and VDP provisioning logic/software 715.

The non-VDP provisioning logic 710 and VDP provisioning logic 715 may take any of a variety of forms, so as to be encoded in one or more tangible computer readable memory media or storage devices for execution, such as fixed logic or programmable logic (e.g., software/computer instructions executed by a processor). In one example, the routing table process logic 710 may be stored in a memory component of the switch ASIC 704. The processor 706 may be an ASIC that comprises fixed digital logic, or a combination thereof.

It should be appreciated that the techniques described above in connection with all embodiments may be performed by one or more computer readable storage media that is encoded with software comprising computer executable instructions to perform the methods and steps described herein. For example, the operations performed by one or more of the ToR switches may be performed by one or more computer or machine readable storage media (non-transitory) or device executed by a processor and comprising software, hardware or a combination of software and hardware to perform the techniques described herein.

This techniques presented herein provide a way to completely automate the provisioning of resources on the ToR Switches (that connect to servers/hypervisors/vSwitches) in a virtualized data center using data packet-based bottom-up triggers to identify an orchestrator's view of virtual machine mobility, represented in the concept of a mobility domain. Again, these techniques do not require any specialized control exchange between the virtual and physical infrastructure. Furthermore, these techniques are especially useful when rapid convergence is required in scenarios such as live migration, etc.

In summary, a method is provided comprising: receiving, at a top-of-rack (ToR) switch in an underlay network hosting one or more tenant networks, the underlay network comprising a plurality of ToR switches each connected to each of a plurality of spine switches, from a virtual machine in a tenant network, a data packet having a header that contains a data packet identifier; determining a mobility domain identifier corresponding to a portion of one or more tenant networks within which the virtual machine can be migrated; forming a unique identifier based on the data packet identifier and mobility domain identifier; and obtaining provisioning information for the tenant network using the unique identifier.

An apparatus is also provided comprising: a plurality of network ports; a switch unit coupled to the plurality of network ports; and a processor coupled to the switch, and configured to: receive, from a virtual machine in a tenant network, a data packet having a header that contains a data packet identifier; determine a mobility domain identifier corresponding to a portion of one or more tenant networks within which the virtual machine can be migrated; form a unique identifier based on the data packet identifier and mobility domain identifier; and obtain provisioning information for the tenant network using the unique identifier.

A computer-readable storage media is also provided encoded with software comprising computer executable instructions and when the software is executed operable to: receive, at a top-of-rack (ToR) switch in an underlay network hosting one or more tenant networks, the underlay network comprising a plurality of ToR switches each connected to each of a plurality of spine switches, from a virtual machine in a tenant network, a data packet having a header that contains a data packet identifier; determine a mobility domain identifier corresponding to a portion of one or more tenant networks within which the virtual machine can be migrated; form a unique identifier based on the data packet identifier and mobility domain identifier; and obtain provisioning information for the tenant network using the unique identifier.

The above description is intended by way of example only.

What is claimed is:

1. A method comprising:
   receiving, at a top-of-rack (ToR) switch in an underlay network hosting one or more tenant networks and comprising a plurality of ToR switches each connected to each of a plurality of spine switches, from a virtual machine in a tenant network, a data packet having a packet header that contains a data packet identifier;
   performing a layer 2 learn event at the TOR switch by reading a media access control (MAC) address in the packet header to discover that the virtual machine and the tenant network have not yet been provisioned;
   determining a mobility domain identifier corresponding to a portion of one or more tenant networks within which the virtual machine can be migrated;
   forming a unique identifier based on the data packet identifier and mobility domain identifier; and
   obtaining provisioning information for the tenant network using the unique identifier.

2. The method of claim 1, wherein the data packet identifier is a virtual local area network (VLAN) identifier.

3. The method of claim 1, wherein the mobility domain identifier comprises a virtual data center identifier associated with a port of the ToR switch.

4. The method of claim 3, further comprising recognizing the mobility domain identifier associated with the port of the ToR switch.

5. The method of claim 1, wherein determining comprises determining the mobility domain identifier from a group consisting of: an identifier of a virtual data center, an identifier of a distributed virtual switch, and an identifier of a distributed resource scheduling cluster that load balances virtual machines.

6. The method of claim 1, wherein the data packet identifier is selected from a group consisting of: a virtual local area network identifier, a virtual extensible local area network identifier, and a multiprotocol label switching label.

7. The method of claim 1, wherein the data packet triggers automated provisioning of resources on the TOR switch from bottom up.

8. An apparatus comprising:
   a plurality of network ports;
   a switch unit coupled to the plurality of network ports;
   a processor coupled to the switch unit, and configured to:
      receive, from a virtual machine in a tenant network, a data packet having a header that contains a data packet identifier;
      perform a layer 2 learn event by reading a media access control (MAC) address in the packet header to discover that the virtual machine and the tenant network have not yet been provisioned;
      determine a mobility domain identifier corresponding to a portion of one or more tenant networks within which the virtual machine can be migrated;
      form a unique identifier based on the data packet identifier and mobility domain identifier; and
      obtain provisioning information for the tenant network using the unique identifier.

9. The apparatus of claim 8, wherein the data packet identifier is a virtual local area network (VLAN) identifier.

10. The apparatus of claim 8, wherein the mobility domain identifier comprises a virtual data center identifier associated with a network port of the plurality of network ports.

11. The apparatus of claim 10, wherein the processor is configured to recognize the mobility domain identifier associated with the network port.

12. The apparatus of claim 8, wherein the mobility domain identifier is selected from a group consisting of: an identifier of a virtual data center, an identifier of a distributed virtual switch, and an identifier of a distributed resource scheduling cluster that load balances virtual machines.

13. The apparatus of claim 8, wherein the data packet identifier is selected from a group consisting of: a virtual local area network identifier, a virtual extensible local area network identifier, and a multiprotocol label switching label.

14. The apparatus of claim 8, wherein the data packet triggers automated provisioning of resources from bottom up.

15. A non-transitory computer-readable storage media encoded with software comprising computer executable instructions and when the software is executed operable to:
   receive, at a top-of-rack (ToR) switch in an underlay network hosting one or more tenant networks and comprising a plurality of ToR switches each connected to each of a plurality of spine switches, from a virtual machine in a tenant network, a data packet having a header that contains a data packet identifier;

perform a layer 2 learn event at the TOR switch by reading a media access control (MAC) address in the packet header to discover that the virtual machine and the tenant network have not yet been provisioned;

determine a mobility domain identifier corresponding to a portion of one or more tenant networks within which the virtual machine can be migrated;

form a unique identifier based on the data packet identifier and mobility domain identifier; and obtain provisioning information for the tenant network using the unique identifier.

16. The non-transitory computer-readable storage media of claim 15, wherein the data packet identifier is a virtual local area network (VLAN) identifier.

17. The non-transitory computer-readable storage media of claim 15, wherein the mobility domain identifier comprises a virtual data center identifier associated with a port of the ToR switch.

18. The non-transitory computer-readable storage media of claim 17, further comprising instructions operable to recognize the mobility domain identifier associated with the port of the ToR switch.

19. The non-transitory computer-readable storage media of claim 15, wherein the mobility domain identifier is selected from a group consisting of: an identifier of a virtual data center, an identifier of a distributed virtual switch, and an identifier of a distributed resource scheduling cluster that load balances virtual machines.

20. The non-transitory computer-readable storage media of claim 15, wherein the data packet triggers automated provisioning of resources on the TOR switch from bottom up.

* * * * *